(12) United States Patent
Chen

(10) Patent No.: US 7,377,331 B2
(45) Date of Patent: *May 27, 2008

(54) DAMPING DRIVING AXLE

(75) Inventor: Ting-Kuang Chen, Keelung (TW)

(73) Assignee: Power Network Industry Co., Ltd., Taoyuan (TW)

( * ) Notice: Subject to any disclaimer, the term of this patent is extended or adjusted under 35 U.S.C. 154(b) by 211 days.

This patent is subject to a terminal disclaimer.

(21) Appl. No.: 11/099,560

(22) Filed: Apr. 6, 2005

(65) Prior Publication Data

US 2006/0225906 A1    Oct. 12, 2006

(51) Int. Cl.
*B23Q 5/00* (2006.01)

(52) U.S. Cl. .................. 173/93.5; 173/93; 173/176; 173/216; 173/104; 173/210

(58) Field of Classification Search ............. 173/210, 173/211, 93.5, 93, 176, 104, 213, 216; 464/66.1, 464/74, 82, 83; 81/463–466, 476–477; 279/902, 279/904
See application file for complete search history.

(56) References Cited

U.S. PATENT DOCUMENTS

| | | | | |
|---|---|---|---|---|
| 4,036,085 A * | 7/1977 | Sjostrand et al. | ............... | 81/464 |
| 4,243,109 A * | 1/1981 | Anderson | ............... | 173/93.5 |
| 4,466,523 A * | 8/1984 | De Carolis et al. | ......... | 192/43.1 |
| 5,788,021 A * | 8/1998 | Tsai | ............... | 188/67 |
| 6,035,947 A * | 3/2000 | Chung | ............... | 173/93.5 |
| 6,068,067 A * | 5/2000 | Kettner | ............... | 173/210 |
| 6,152,242 A * | 11/2000 | Chung | ............... | 173/48 |
| 6,171,193 B1 * | 1/2001 | Rohs et al. | ............... | 464/68.9 |
| 6,202,759 B1 * | 3/2001 | Chen | ............... | 173/48 |
| 6,311,787 B1 * | 11/2001 | Berry et al. | ............... | 173/176 |
| 6,338,404 B1 | 1/2002 | Chen | ............... | 192/223 |
| 6,360,828 B1 * | 3/2002 | Chung | ............... | 173/93.5 |
| 6,454,020 B1 | 9/2002 | Jong | ............... | 173/93 |
| 6,484,859 B2 * | 11/2002 | Chludek | ............... | 192/55.6 |
| 6,547,053 B2 * | 4/2003 | Shih | ............... | 192/55.61 |
| 6,715,562 B1 | 4/2004 | Chen | ............... | 173/93.5 |
| 6,926,095 B2 * | 8/2005 | Chen | ............... | 173/48 |
| 6,997,087 B2 * | 2/2006 | Rastegar et al. | ............... | 81/466 |
| 2002/0121384 A1 * | 9/2002 | Saito et al. | ............... | 173/109 |

FOREIGN PATENT DOCUMENTS

TW    00588680    *  5/2004

* cited by examiner

*Primary Examiner*—Rinaldi Rada
*Assistant Examiner*—Michelle Lopez
(74) *Attorney, Agent, or Firm*—Rabin & Berdo, P.C.

(57) ABSTRACT

A damping drive axle includes an output shaft divided into a first portion and a second portion, a mounting seat having a centrally defined hole, a first compartment to correspond to and receive therein the first portion of the output shaft and a second compartment to receive therein the second portion of the output shaft, a hollow cylinder with having a triangle opening to allow an extension of the second portion of the output shaft, multiple columns rotatably received in a side defining the triangle opening to selectively lock/release the second portion of the output shaft, multiple cutouts defined in a bottom face of the cylinder and multiple legs extending out from the bottom face of the cylinder, each leg being sandwiched by two adjacent cutouts and an input device to rotate the sleeve of the hollow cylinder.

6 Claims, 6 Drawing Sheets

DAMPING DRIVING AXLE

BACKGROUND OF THE INVENTION

1. Field of the Invention

The present invention relates to a driving axle, and more particularly to a driving axle having a damping mechanism to damp impact.

2. Description of Related Art

In power tools, such as a power screwdriver or a power drill, a drive axle is provided to transmit the rotating power from the motor to the tool head mounted on a front portion of the tool so as to accomplish the designed function. Inside the power tools, a reduction gear set is provided so that the power tool is able to rotate in different speeds or to provide different torques. In general, the reduction gear set is composed of multiple sets of planetary gears combined together. The reason why the planetary gears are able to work together is because of a clutch mechanism such that a portion of the planetary gears of all of the planetary gears are able to work to accomplish the objective. During the operation of the planetary gears, collision of the planetary gears often causes noises, which makes working with these tools annoying and the mutual collision between tool parts wears the tool and the life span thereof is thus reduced.

To overcome the aforementioned disadvantages, an improved drive axle is essential.

SUMMARY OF THE INVENTION

The primary objective of the present invention is to provide an improved drive tool having a damping mechanism provided therein so that collision between parts is damped and thus the life span of the tool is prolonged.

Other objects, advantages, and novel features of the invention will become more apparent from the following detailed description when taken in conjunction with the accompanying drawings.

DETAILED DESCRIPTION OF PREFERRED EMBODIMENT

Figure 1:
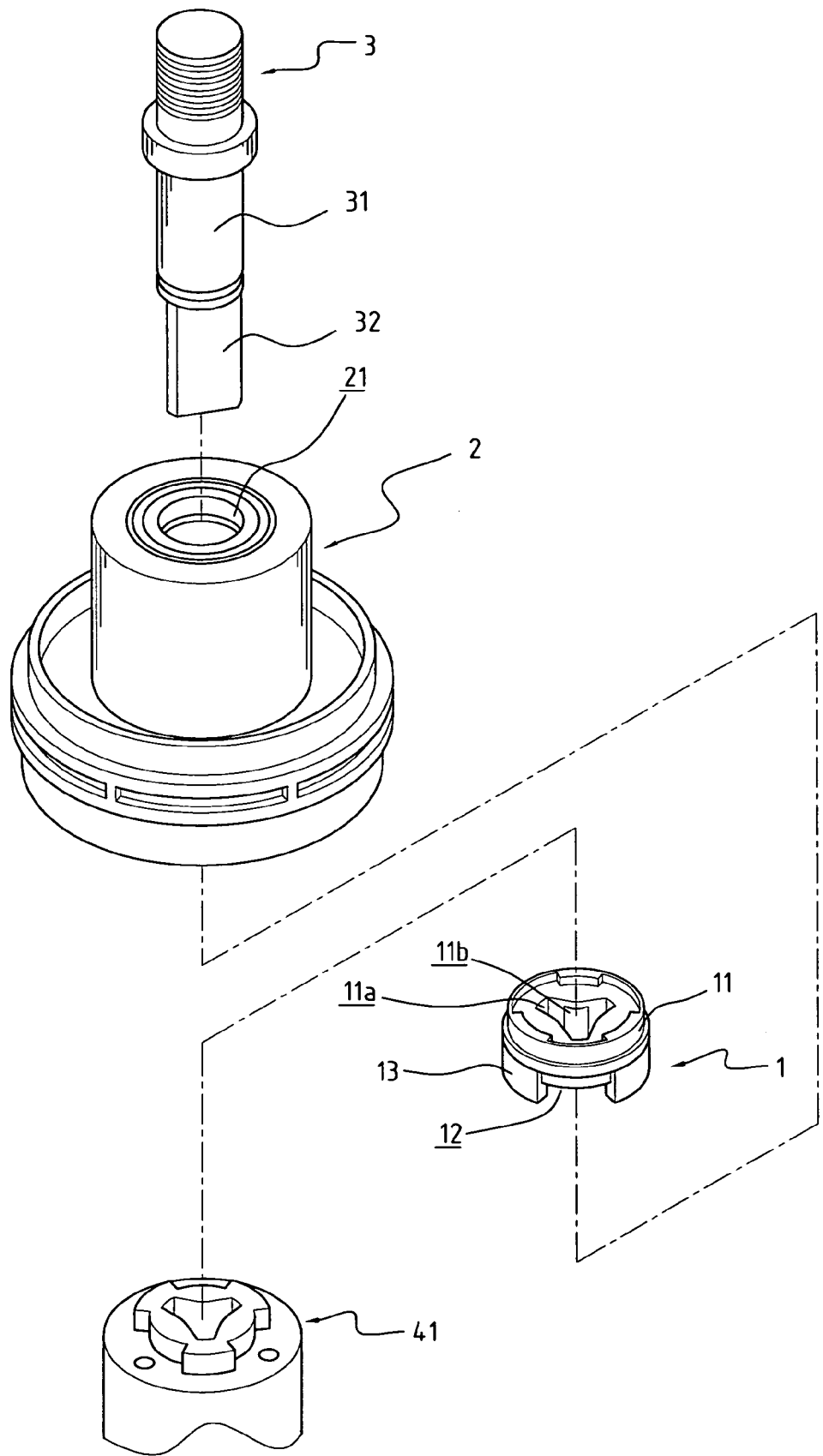
FIG. 1 is an exploded perspective view of a damping drive tool of the present invention.
Figure 2:
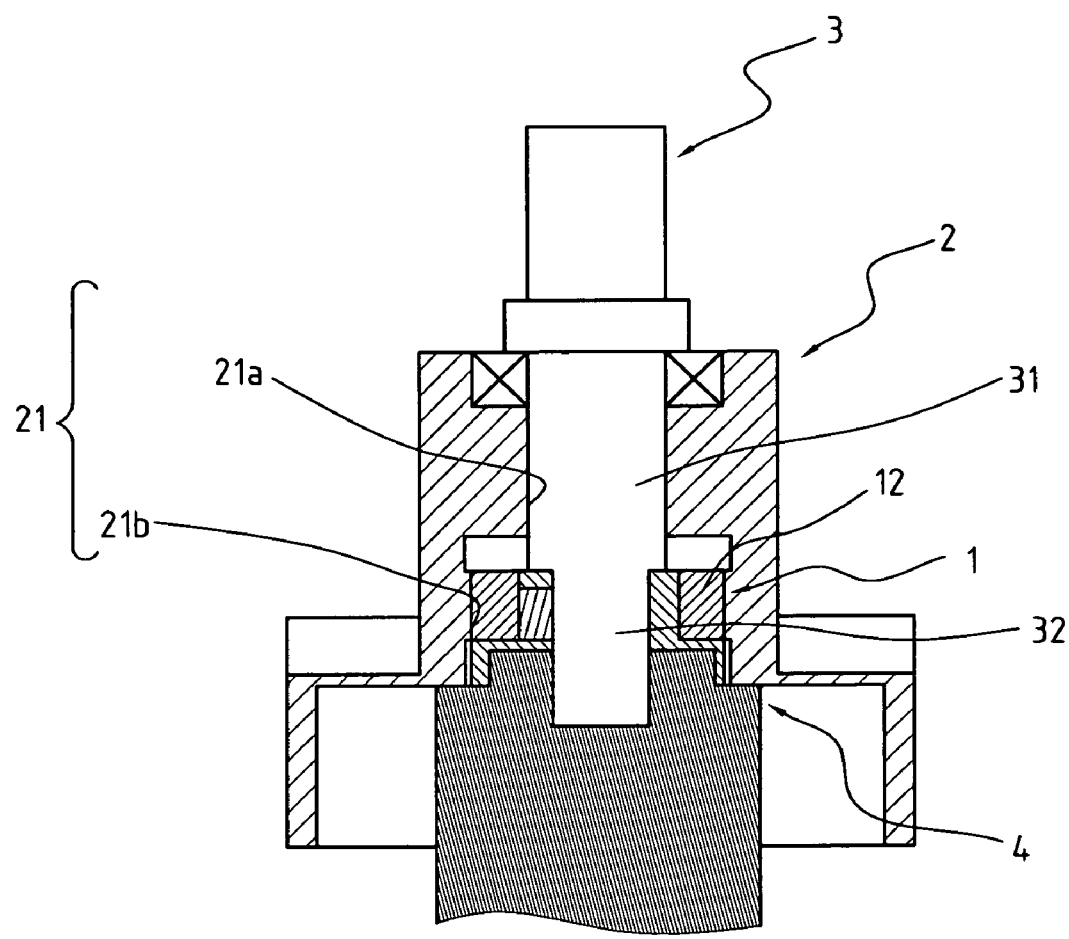
FIG. 2 is a cross-sectional view showing the assembly of the damping drive tool in FIG. 1.
Figure 3:
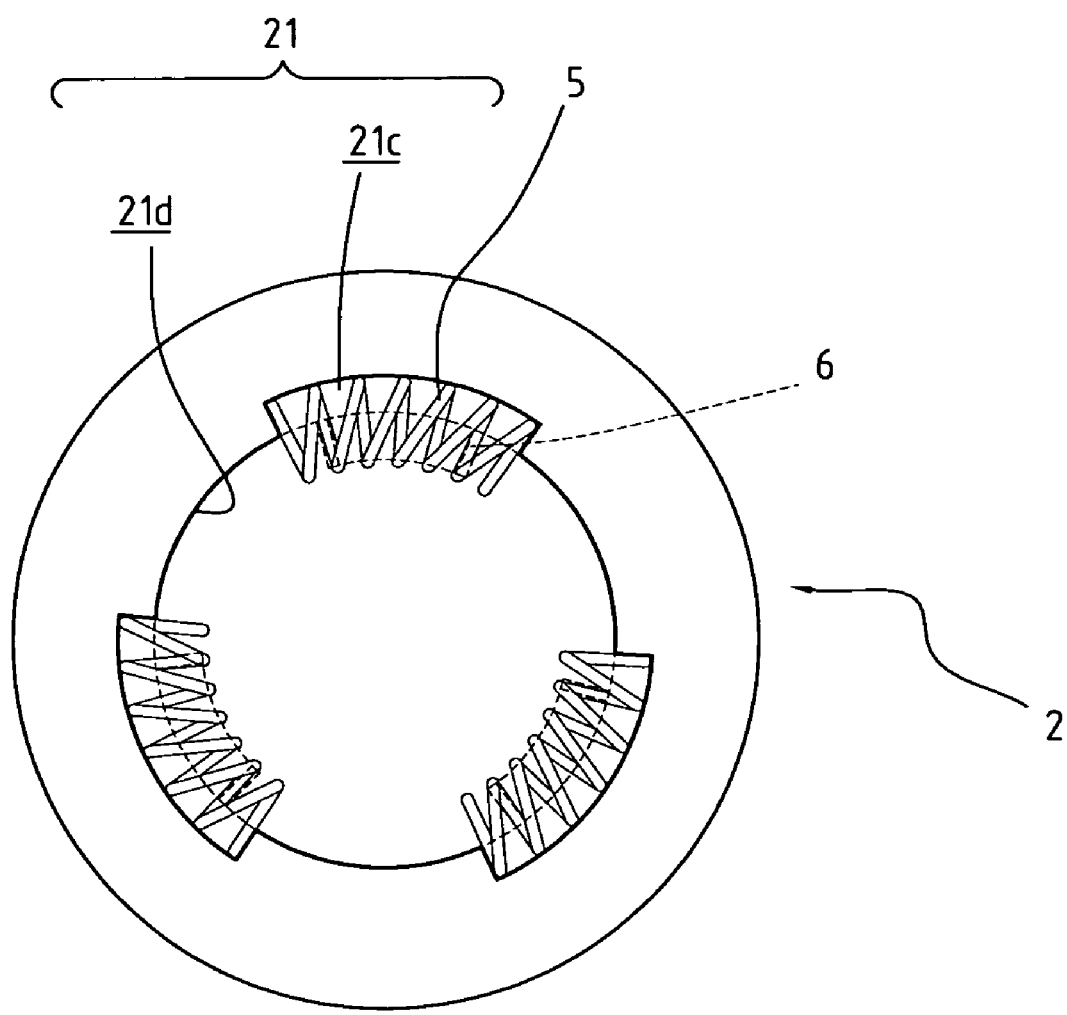
FIG. 3 is a schematic top plan view showing the structure of the mounting seat.
Figure 4:
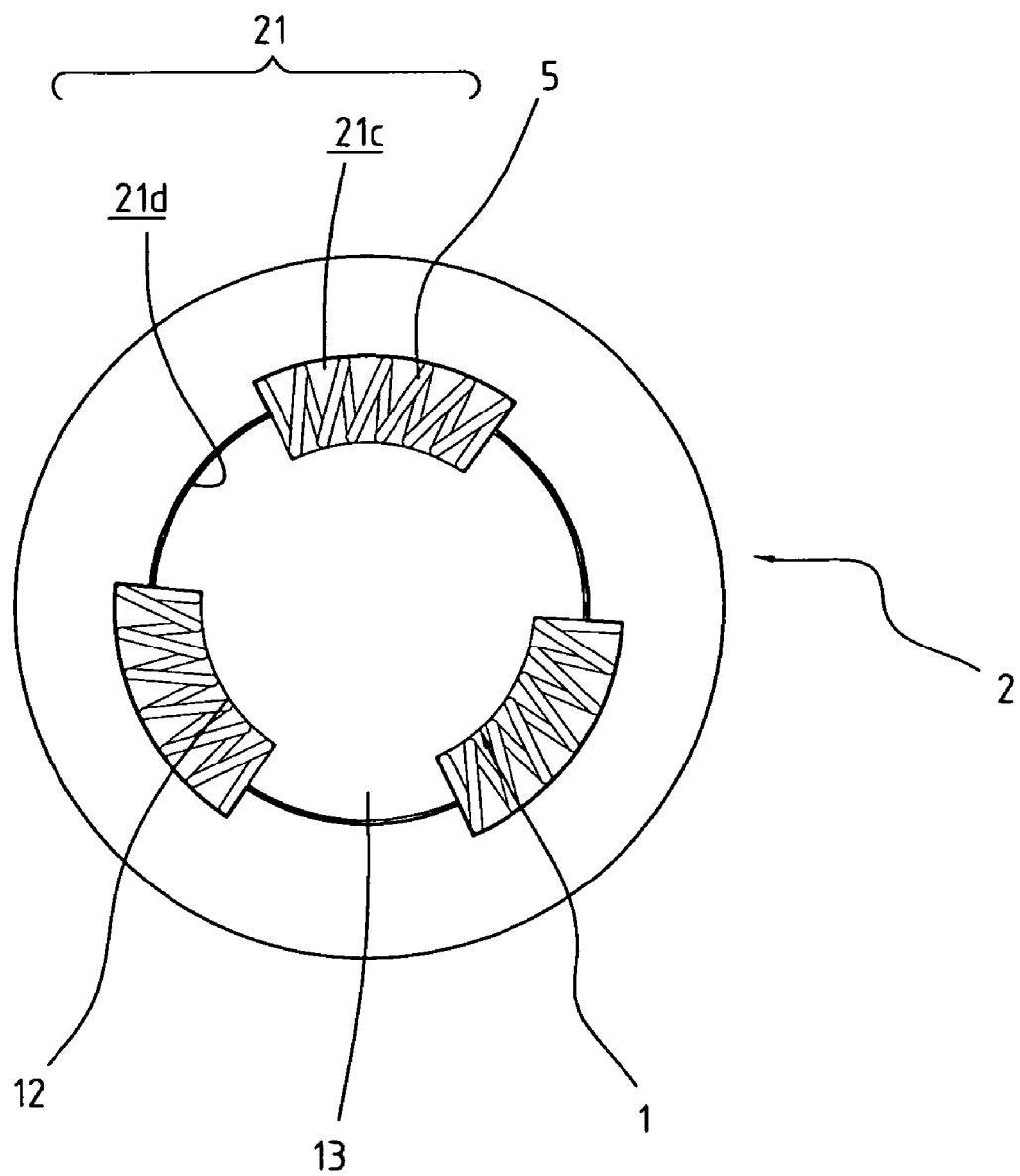
FIG. 4 is a schematic bottom plan view showing the structure of the mounting seat.
Figure 5:
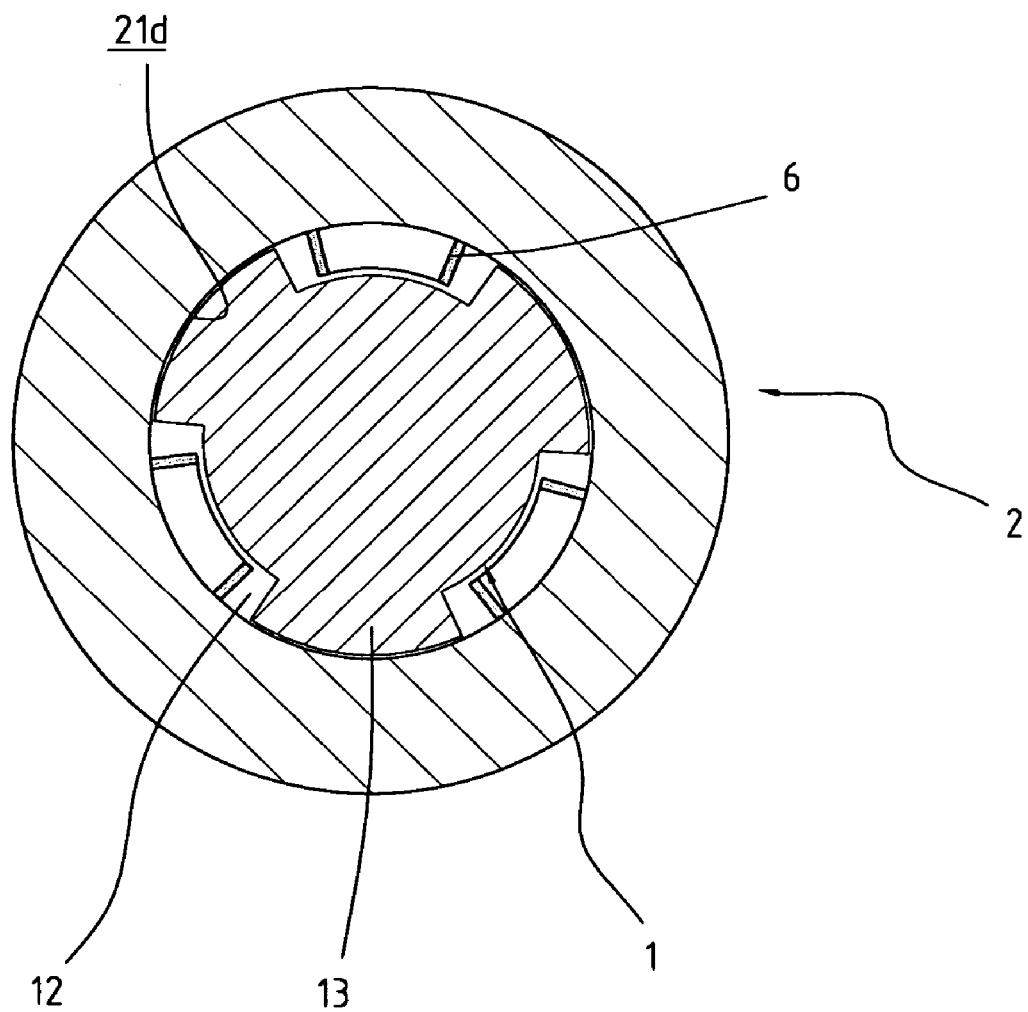
FIG. 5 is a schematic cross-sectional view showing the mounting seat.
Figure 6:
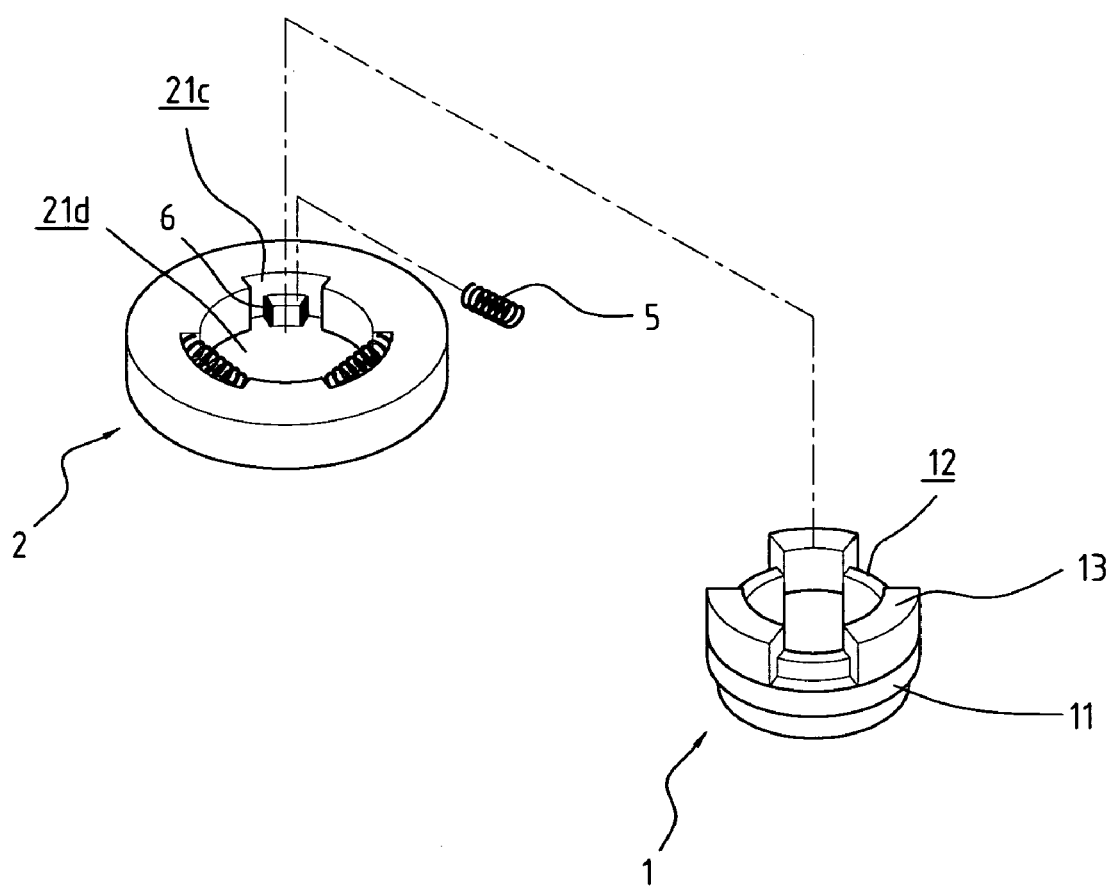
FIG. 6 an exploded perspective view showing a portion of the mounting seat and the locking device of the present invention.

With reference to the drawings and in particular to FIG. 1, a damping drive axle constructed in accordance with the present invention includes a locking device 1, a mounting seat 2, an output shaft 3 and an input device 4 to provide a rotating force t the output shaft 3.

The locking device 1 of the present invention is a hollow cylinder with two open ends and includes a sleeve 11 rotatably received in the cylinder and having a substantially triangle opening 11a, multiple columns 11b respectively and rotatably received in a side of the triangle opening 11a, multiple cutouts 12 defined in a bottom face of the locking device 1 and multiple legs 13 each sandwiched between two adjacent cutouts 12.

The mounting seat 2 is a hollow column and has a centrally defined hole 21, a first compartment 21a to correspond to and receive therein the output shaft 3 and a second compartment 21b in communication with the first compartment 21a to receive therein the locking device 1.

The output shaft 3 is divided into a first portion 31 received in the first compartment 21a of the mounting seat 2 and a second portion 32 to be extended into the triangle opening 11a. It is to be noted that the second portion 32 of the output shaft 3 is configured to have a shape corresponding to that of the triangle opening 11a of the locking device 1. That is, the shape of the triangle opening 11a is a trajectory scanned by the second portion 32 of the output shaft 3. Therefore, after the second portion 32 of the output shaft 3 is extended into the triangle opening 11a of the locking device 1, the columns 11b are able to selectively lock and release the second portion 32 of the output shaft 3, which is described in Taiwan Patent No. 588680 and detailed description thereof is omitted hereinr.

With reference to FIGS. 3-6, inside the second chamber 21b, multiple axial cutouts 21c are defined in an inner periphery of the second chamber 21b to correspond to and mate with the cutouts 12 of the locking device 1 such that a first receiving space is defined between the locking device 1 and the mounting seat 2 to receive therein resilient elements 5 and multiple longitudinal cutouts 21d are defined in the inner periphery of the second chamber 21b to correspond to the legs 13 of the locking device 1 such that a second receiving space is defined between the locking device 1 and the mounting seat 2 to receive therein damping elements 6. With the provision of the resilient elements 5 and the damping elements 6, when the locking device 1 is rotated relative to the second portion 21b of the mounting seat 2, the impact therebetween is thus cushioned and damped. Preferably, the resilient elements 5 may be springs and the damping elements 6 may be made of rubber.

When the sleeve 11 is locked by the locking device 1, a relative movement is existed between the locking device 1 and the mounting seat 2. However, because of the resilient elements 5 and the damping elements 6, noise and vibration caused by the collision between the locking device and the locking device 1 are reduced.

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A damping drive axle, comprising:
an output shaft divided into a first portion and a second portion;
a mounting seat being a hollow column and having a centrally defined hole, the centrally defined hole including a first compartment to correspond to and receive therein the first portion of the output shaft and a second compartment in communication with the first compartment to receive therein the second portion of the output shaft;
a locking device that includes a hollow cylinder with two open ends, and having a sleeve rotatably received in the hollow cylinder, a triangle opening to allow an extension of the second portion of the output shaft, multiple columns rotatably received in a side defining the triangle opening to selectively lock/release the second portion of the output shaft, multiple cutouts defined in a bottom face of the cylinder and multiple legs extending out from the bottom face of the cylinder, each leg being sandwiched by two adjacent cutouts; and
an input device to rotate the sleeve of the locking device.

2. The damping drive axle as claimed in claim 1, wherein the mounting seat has multiple axial cutouts in the second compartment to correspond to the cutouts of the locking device to define therebetween a first receiving space to receive therein resilient elements so as to provide a cushion to the second portion of the output shaft after the second portion is received in the second compartment of the mounting seat.

3. The damping drive axle as claimed in claim 1, wherein the mounting seat has multiple cutouts defined in an inner periphery of the second compartment to correspond to the legs of the locking device to define therebetween a second receiving space to receive therein multiple damping elements.

4. The damping drive axle as claimed in claim 2, wherein the mounting seat has multiple further cutouts defined in an inner periphery of the second compartment to receive therein multiple damping elements.

5. The damping drive axle as claimed in claim 2, wherein the resilient elements are springs.

6. The damping drive axle as claimed in claim 3, wherein the damping elements are made of rubber.

* * * * *